(12) United States Patent
Malik et al.

(10) Patent No.: US 7,603,467 B2
(45) Date of Patent: *Oct. 13, 2009

(54) INSTANT MESSAGING ARCHITECTURE AND SYSTEM FOR INTEROPERABILITY AND PRESENCE MANAGEMENT

(75) Inventors: Dale Malik, Atlanta, GA (US); Matt Peterson, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 168 days.

This patent is subject to a terminal disclaimer.

(21) Appl. No.: 11/352,435

(22) Filed: Feb. 10, 2006

(65) Prior Publication Data

US 2007/0168449 A1 Jul. 19, 2007

Related U.S. Application Data

(63) Continuation of application No. 10/135,929, filed on Apr. 29, 2002, now Pat. No. 7,016,978.

(51) Int. Cl.
*G06F 15/16* (2006.01)
(52) U.S. Cl. .................. 709/227; 709/204; 709/206; 709/230
(58) Field of Classification Search .......... 709/204, 709/206, 207, 227, 230
See application file for complete search history.

(56) References Cited

U.S. PATENT DOCUMENTS

| | | | |
|---|---|---|---|
| 5,497,373 A | 3/1996 | Hulen et al. | |
| 6,430,602 B1 * | 8/2002 | Kay et al. | 709/206 |
| 6,449,344 B1 * | 9/2002 | Goldfinger et al. | 379/88.17 |
| 6,463,078 B1 | 10/2002 | Engstrom et al. | |
| 6,535,486 B1 | 3/2003 | Naudus et al. | |
| 6,549,937 B1 | 4/2003 | Auerbach et al. | |
| 6,564,261 B1 * | 5/2003 | Gudjonsson et al. | 709/227 |
| 6,629,163 B1 | 9/2003 | Balassanian | |
| 6,714,793 B1 * | 3/2004 | Carey et al. | 455/466 |
| 6,738,822 B2 | 5/2004 | Fukasawa et al. | |

(Continued)

FOREIGN PATENT DOCUMENTS

WO 2004/027559 4/2004

(Continued)

OTHER PUBLICATIONS

Trillian; "Trillian 74", www.download.com, Sep. 2002, 2 pages.

(Continued)

*Primary Examiner*—Larry D Donaghue
*Assistant Examiner*—Brian J Gillis
(74) *Attorney, Agent, or Firm*—Thomas, Kayden, Horstemeyer & Risley, LLP (57) ABSTRACT

A computer network system establishes an instant messaging (IM) session between a first user registered with a first ISP (ISP) and at least one user registered with a second ISP when the two ISPs operate using different IM protocols. The ISPs each contain a Local IM server connected to each registered user. Each ISP also contains a Universal IM server that is connected to the distributed network. The Universal IM server includes a database that stores routing information and Presence information for each user registered with the second ISPs and facilitates communications between the first and second user using a universal format, such as XML.

24 Claims, 6 Drawing Sheets

U.S. PATENT DOCUMENTS

| | | | |
|---|---|---|---|
| 6,760,580 B2 * | 7/2004 | Robinson et al. ......... | 455/412.2 |
| 6,976,092 B1 | 12/2005 | Daniell | |
| 7,016,978 B2 | 3/2006 | Malik | |
| 7,035,942 B2 | 4/2006 | Daniell | |
| 2002/0087704 A1 | 7/2002 | Chesnais et al. | |
| 2002/0118809 A1 | 8/2002 | Eisenberg | |
| 2002/0163934 A1 | 11/2002 | Moore | |
| 2003/0054810 A1 | 3/2003 | Chen et al. | |
| 2004/0015723 A1 | 1/2004 | Pham et al. | |
| 2004/0193722 A1 * | 9/2004 | Donovan .................. | 709/230 |

FOREIGN PATENT DOCUMENTS

| | | |
|---|---|---|
| WO | 2004/027561 | 4/2004 |
| WO | 2004/027562 | 4/2004 |
| WO | PCT/US03/29066 | 5/2004 |
| WO | PCT/US03/29226 | 5/2004 |
| WO | PCT/US03/29225 | 6/2004 |

OTHER PUBLICATIONS

WWW.MALVINO.COM; "Startup Programs", www.malvino.com, Nov. 1998, 7 pages.
WWW.CERULEANSTUDIOS.COM; "Trillian-Communicate with Flexibility and Style", printed Mar. 2, 2004, 15 pages.
Day; "A Model for Presence and Instant Messaging", Feb. 2000, pp. 1-17.
W3C; "Extensible Markup Language (XML) 1.0", Second Edition, W3C Recommendation, Oct. 6, 2000, pp. 1-59.
Atkins; Common Presence and Instant Messaging (CPIM), Aug. 14, 2002, pp. 1-30.
Sugano: "Common Presence and Instant Messaging (CPIM) Presence Information Data Format", May 2002. pp. 1-23.
Crocker; "Common Presence and Instant Messaging (CPIM)", Aug. 14, 2002, pp. 1-35.
Ramsdell; "Simple Instant Messaging and presence 1.3 Protocol", dated Jun. 2001, pp. 1-19.
International Search Report PCT/US03/29066 filed Sep. 16, 2003.
International Search Report PCT/US03/29225 filed Sep. 15, 2003.
International Search Report PCT/US03/29226 filed Sep. 15, 2003.
Daniell; U.S. Appl. No. 10/274,405, filed Oct. 18, 2002.
Daniell; U.S. Appl. No. 10/274,408, filed Oct. 18, 2002.
Kent; U.S. Appl. No. 10/368,099, filed Feb. 18, 2003.
Daniell; U.S. Appl. No. 10/274,478, filed Oct. 18, 2002.
Daigle; U.S. Appl. No. 10/408,514, filed Apr. 7, 2003.
Daniell; U.S. Appl. No. 10/325,290, filed Dec. 19, 2002.
Malik; U.S. Appl. No. 10/135,929, filed Apr. 29, 2002.
Daniell; U.S. Appl. No. 11/210,187, filed Aug. 23, 2007.
Day; Instant Messaging / Presence Protocol Requirements; Feb. 2000; pp. 1-26.
Ramsdell; The MITRE Corporation, entitled: Simple Instant Messaging and Presence 1.3 Protocol, Jun. 2001, pp. 19.
Saint-Andre; Jabber FAQ, May 13, 2001, printed from the website address: http://web.qarchive.org/web/20010603135226/docs. Jabber.org/general/html/faz.html; pp. 1-39.
Saint-Andre; XML Messaging with Jabber, Oct. 6, 2000, printed from website address: http://www.openp2p.com/pub.a/p2p/2000/10/06/jabber_xml.htmp?page-1; pp. 1-8.
Daniell; U.S. Appl. No. 11/305,596, filed Dec. 16, 2005.
Daniell; Non-Final Rejection mailed Mar. 26, 2004 for U.S. Appl. No. 10/274,408, filed Oct. 18, 2002.
Daniell; Ex Parte Quayle Action with Interview Summary mailed Oct. 4, 2004 for U.S. Appl. No. 10/274,408, filed Oct. 18, 2002.
Daniell; Notice of Allowance mailed Jan. 6, 2005 for U.S. Appl. No. 10/274,408, filed Oct. 18, 2002.
Daniell; Notice of Allowance and Fees Due mailed May 23, 2005 for U.S. Appl. No. 10/274,408, filed Oct. 18, 2002.
Daniell; Supplemental Notice of Allowance and Fees Due mailed Sep. 21, 2005 for U.S. Appl. No. 10/274,408, filed Oct. 18, 2002.
Daniell; Non-Final Rejection mailed Oct. 5, 2007 for U.S. Appl. No. 11/210,187, filed Aug. 23, 2007.
Daniell; Ex Parte Quayle Action mailed Apr. 17, 2008 for U.S. Appl. No. 11/210,187, filed Aug. 23, 2005.
Daniell; Notice of Allowance and Fees Due mailed Jul. 14, 2008 for U.S. Appl. No. 11/210,187, filed Aug. 23, 2005.
Kent; Non-Final Rejection mailed Oct. 30, 2006 for U.S. Appl. No. 10/368,099, filed Feb. 18, 2003.
Kent; Non-Final Rejection mailed Apr. 19, 2007 for U.S. Appl. No. 10/368,099, filed Feb. 18, 2003.
Kent; Non-Final Rejection mailed Oct. 11, 2007 for U.S. Appl. No. 10/368,099, filed Feb. 18, 2003.
Kent; Non-Final Rejection mailed Apr. 7, 2008 for U.S. Appl. No. 10/368,099, filed Feb. 18, 2003.
Daniell; Non-Final Rejection mailed Mar. 25, 2004 for U.S. Appl. No. 10/274,478, filed Oct. 18, 2002.
Daniell; Non-Final Rejection mailed Oct. 7, 2004 for U.S. Appl. No. 10/274,478, filed Oct. 18, 2002.
Daniell; Final Rejection mailed Jul. 27, 2005 for U.S. Appl. No. 10/274,478, filed Oct. 18, 2002.
Daniell; Notice of Allowance mailed Nov. 16, 2005 for U.S. Appl. No. 10/325,290 U.S. Appl. No. 10/274,478, filed Oct. 18, 2002.
Daniell; Non-Final Rejection mailed Apr. 9, 2007 U.S. Appl. No. 11/305,596, filed Dec. 16, 2005.
Daniell; Final Rejection mailed Sep. 25, 2007 for U.S. Appl. No. 11/305,596, filed Dec. 16, 2005.
Daniell; Examiner Interview Summary mailed May 15, 2008 for U.S. Appl. No. 11/305,596, filed Dec. 16, 2005.
Daniell; Notice of Allowance and Fees Due mailed Sep. 18, 2008 U.S. Appl. No. 11/305,596, filed Dec. 16, 2005.
Daniell; Non-Final Rejection mailed Jan. 30, 2004 for U.S. Appl. No. 10/325,290, filed Dec. 19, 2002.
Daniell; Non-Final Rejection mailed Jun. 17, 2004 for U.S. Appl. No. 10/325,290, filed Dec. 19, 2002.
Daniell; Examiner Interview Summary Record mailed Jul. 20, 2004 for U.S. Appl. No. 10/325,290, filed Dec. 19, 2002.
Daniell; Non-Final Rejection mailed Feb. 8, 2005 for U.S. Appl. No. 10/325,290, filed Dec. 19, 2002.
Daniell; Examiner Interview Summary Record mailed Apr. 15, 2005 for U.S. Appl. No. 10/325,290, filed Dec. 19, 2002.
Daniell; Final Rejection mailed Aug. 11, 2005 for U.S. Appl. No. 10/325,290, filed Dec. 19, 2002.
Daniell; Non-Final Rejection mailed Dec. 19, 2005 for U.S. Appl. No. 101325,290, filed Dec. 19, 2002.
Daniell; Examiner Interview Summary Record mailed Feb. 27, 2006 for U.S. Appl. No. 10/325,290, filed Dec. 19, 2002.
Daniell; Final Rejection mailed May 15, 2006 for U.S. Appl. No. 10/325,290, filed Dec. 19, 2002.
Daniell; Examiner Interview Summary Record mailed Jul. 5, 2006 for U.S. Appl. No. 10/325,290, filed Dec. 19, 2002.
Daniell; Notice of Allowance and Fees Due mailed Nov. 13, 2006 for U.S. Appl. No. 10/325,290, filed Dec. 19, 2002.
Daniell; p. 2 of Notice of Allowance and Fees Due, identified as mailed via Private PAIR / FILE WRAPPER on Dec. 8, 2006 for U.S. Appl. No. 10/325,290, filed Dec. 19, 2002.
Daigle; Non-Final Rejection mailed May 17, 2006 for U.S. Appl. No. 101408,514, filed Apr. 7, 2003.
Daigle; Examiner Interview Summary Record mailed Jul. 21, 2006 for U.S. Appl. No. 10/408,514, filed Apr. 7, 2003.
Daigle; Final Rejection mailed Nov. 16, 2006 for U.S. Appl. No. 10/408,514, filed Apr. 7, 2003.
Daigle; Examiner Interview Summary Record mailed Feb. 12, 2007 for U.S. Appl. No. 10/408,514, filed Apr. 7, 2003.
Daigle; Non-Final Rejection mailed Mar. 21, 2007 for U.S. Appl. No. 10/408,514, filed Apr. 7, 2003.
Daigle; Examiner Interview Summary Record mailed Jun. 18, 2007 for U.S. Appl. No. 10/408,514, filed Apr. 7, 2003.
Daigle; Final Rejection mailed Sep. 10, 2007 for U.S. Appl. No. 10/408,514, filed Apr. 7, 2003.
Daigle; Non-Final Rejection mailed Feb. 21, 2008 for U.S. Appl. No. 10/408,514, filed Apr. 7, 2003.
Malik; Non-Final Rejection mailed Jun. 22, 2005 for U.S. Appl. No. 10/135,929, filed Apr. 29, 2002.
Malik; Notice of Allowance and Interview Summary mailed Dec. 29, 2005 for U.S. Appl. No. 10/135,929, filed Apr. 29, 2002.

* cited by examiner

INSTANT MESSAGING ARCHITECTURE AND SYSTEM FOR INTEROPERABILITY AND PRESENCE MANAGEMENT

CROSS-REFERENCE TO RELATED APPLICATION

This application is a continuation of U.S. patent application having Ser. No. 10/135,929, filed Apr. 29, 2002 now U.S Pat No. 7,016,978, which is entirely incorporated herein by reference.

TECHNICAL FIELD

This invention relates generally to instant messaging, and more particularly relates to providing an open network to provide interoperability between multiple platforms operating under a single instant messaging standard.

BACKGROUND

The Internet has changed the way people communicate. For many people, electronic mail, known as "e-mail," has practically replaced traditional letters and in some instances, phone calls, as the primary means of communication. Users of the Internet send literally millions of e-mail messages across the Internet on a daily basis. The popularity of being able to send messages anywhere in the world in a matter of minutes, or even seconds, has made e-mail the most rapidly accepted form of correspondence to date. The use of e-mail has risen from obscurity, used once only by academics and the military, to the dominant mode of public communication in less than twenty years.

However, in our fast-paced world where the desire for access to more information at a faster rate increases on a daily basis, the once rapid response of e-mail communications is no longer fast enough to keep pace with society's need. One way to help people communicate faster was the creation of instant messaging ("IM") services. IM services allow for nearly real time communications because the users sending and receiving messages are continually connected to an IM service. The speed at which recipients get IM messages is determined by the speed the data can travel across the Internet. When a subscriber logs into an IM service, the service lets an IM server know that the user is available to receive messages. To send a message to a recipient, the subscriber simply selects the name of the recipient, usually from a contact list that contains the recipient's IM address, and types the message.

The core of IM is based on the concept of "presence management," which determines where a user is connected to the Internet, the availability of the user, and on what system the user resides. Similar to email, a system level designation (domain) is the first tier of recognizing where to reach a particular user. IM, however, requires at least two additional elements (location and status) that make up the core of presence management. The immediate nature of this type of communication requires that the exact IP address of the person and their willingness to accept a message be known in order to set up a connection.

IM was initially available to only dial up Internet users, which made location specific information extremely important. In the last couple of years the access of IM services has spread across mobile devices, such as cellular telephones, personal digital assistants (PDAs), and almost any system capable of Internet access. This proliferation has added the need to manage other elements of presence that did not exist in the past. With the potential to have multiple devices active, such as PC, PDA, cellular telephone, pager, etc., the presence system must be able to identify and manage each Internet device connected to the Internet and determine to which device messages should be forwarded.

To accommodate the rapid growth in IM, each Internet Service Provider (ISP) developed their own brand of technology to locate and connect users within their community. In doing so, each ISP selected different methods for managing presence and setting up communications paths between two parties. Unfortunately, these methods do not allow users of one system to easily contact and communicate with users of other systems. There is a need to enable effective intersystem communication and provide a path to grow future interoperability without negatively affecting the current separate networks in operation.

Currently, ISPs use one of three methods to transmit instant messages between subscribers on their network. The first method uses a centralized network, in which subscribers are connected to one another through a series of network servers. The individual servers are linked together to form a large, centralized network. In this architecture, each server keeps track of the presence information and connections for each user connected to the network. When a subscriber sends a message, the server determines the location of the recipient's computer by contacting all of the other network servers and routes the message through the network servers until it reaches the recipient. This particular method is used by Microsoft Network (MSN) Messenger IM service.

A second method of transmitting instant messages uses a peer-to-peer architecture favored by systems using ICQ protocol (pronounced "I seek you"), such as the Yahoo!® Messenger IM service. In the peer-to-peer approach, a central ICQ server keeps track of which subscribers are currently online and records their Internet IM protocol addresses. Once a subscriber logs on to the ICQ server, the ICQ server scans the subscriber's contact list and displays to the subscriber the Internet IM protocol address of every person on the contact list currently logged onto the IM server. When the subscriber wants to send a message to a recipient on the ICQ server, the subscriber simply selects the name of the recipient, types a message, and transmits the message. Because the ICQ client on the subscriber's computer has the Internet Protocol IM address of the recipient, the message is sent directly to the ICQ client residing on the recipient's computer without involving the ICQ server. This method has an advantage over the centralized network system because the messages do no travel through the entire network, which speeds the transfers of large files, such as documents and images because they are not slowed by network traffic.

When the conversation is complete, the subscriber exits the IM program, at which point the ICQ client on the subscriber's computer generates a message to the ICQ server to terminate the session. The ICQ client then sends a message to each ICQ client on the subscriber's contact list, that are currently logged onto the ICQ server, indicating that the subscriber has terminated his session.

The last method of transmitting instant messages is using a hybrid system that combines the centralized network approach with the peer-to-peer approach. America On Line's (AOL®'s) Instant Messaging ("AIM") service currently uses this method. The AOL® AIM service uses the centralized network approach for transmitting text messages and performing presence management. Because text messages are usually small, transmitting them over the network does not noticeably slow their delivery. However, for large files, such as document and images, AOL® AIM service uses ICQ protocol to establish a peer-to-peer connection between the subscriber and the recipient of the message.

Unfortunately, each of the current IM services lacks a coherent standard. Each IM service uses a separate proprietary protocol to implement instant messaging on their network. As a result, a user can only receive presence information and send messages to individuals that are registered with the same IM service as the sender. Thus, the lack of a standard protocol for IM severely limits the potential application of IM by restricting the number of potential recipients to those users registered on the same service as the sender of the IM message.

Figure 1:
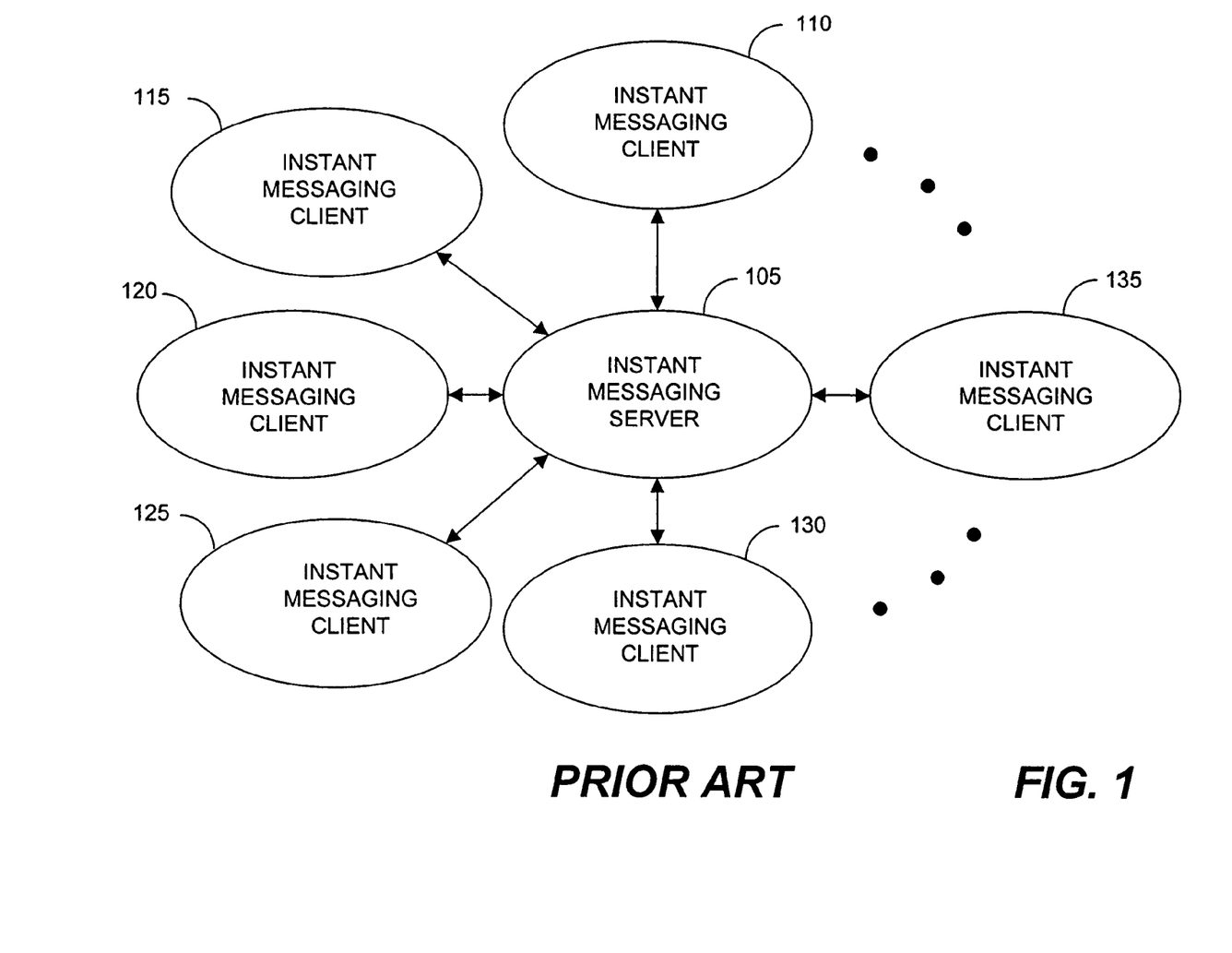
FIG. 1 is an illustration of a prior art instant messaging system.

An example of a traditional instant messaging architecture is shown in FIG. 1. The traditional IM architecture consists of a central IM server 105 connected to a number of individual IM clients (110, 115, 120, 125, 130, and 145) in a closed network. To send an IM, from client 110 to client 145, IM client 110 first connects with an IM server 105 using a proprietary protocol. For example, AOL® and Yahoo!® use ICQ. Once the IM client 110 is connected to the IM server 105, the user logs on by entering a user name and password. The IM client 110 then sends the IM server 105 the connection information, such as the IP address and number of the port assigned to the IM client and the name and address of everyone in the IM contact list associated with the IM client 110.

The IM server 105 then creates a temporary file that contains the connection information for the IM client 110 and for each IM client. Once the temporary files have been created, the IM server 105 checks the network to determine whether any IM client identified by the contact list associated with IM client 110 is currently logged into the system. If the IM server 105 finds any of the contacts logged onto the network, the IM server 105 sends a message back to the IM client 110 with the connection information for each IM client currently logged onto the network. When the IM client 110 receives the connection information, the status of that particular IM client is updated to "Online," which is displayed to the user. At this point the user may select any IM client that is registered "Online," at which point a dialog box will appear in which the user may enter text. Because the IM client 110 knows the address and port number of the IM client 145 the message is sent directly to the recipient IM client 145. The IM client 145 then receives the instant message and can respond. Once the IM session is complete the dialog box is closed and the IM client 110 goes offline and sends a message to the IM server 105 terminating the session. The IM server 105, in response to acknowledging that the IM client 110 has logged off, generates a message to each of the IM clients on the client list of IM client 110 indicating that IM client 110 is logged off the network.

A major drawback to this system is that each IM client that a user wishes to communicate with must be connected to the IM server and must be part of the network due to the proprietary nature of the protocol. If the IM client happens to lie outside the IM network, he or she will not be able communicate with anyone in the network.

One solution to the interoperability problem is an attempt by the Internet Engineering Task Force (IETF) to develop a standard protocol for instant messaging known as Instant Messaging Presence Protocol. Many of the IM service providers have been working within the IETF to develop a standard IM protocol. However, because each IM service provider has spent considerable capital developing a format for instant messaging, the IETF has yet been unable to establish a standard protocol.

Another solution to the interoperability problem is JABBER, which is an IM system focused on providing IM access to any user from anywhere using any device and interoperability with IM services. JABBER is Extensible Markup Language (XML) open source server software that was developed by a community of developers over the Internet. JABBER allows communication among applications and systems across all platforms. Developers write additional modules to submit them back for possible incorporation into the JABBER software. Unfortunately, most of the IM services do not use XML as their IM format. Therefore, to achieve interoperability between the IM services, JABBER requires a translation module to translate the IM message in XML format into each of the formats used by the separate IM services. Therefore, the JABBER system adds additional cost and complexity to the IM infrastructure.

Figure 2:
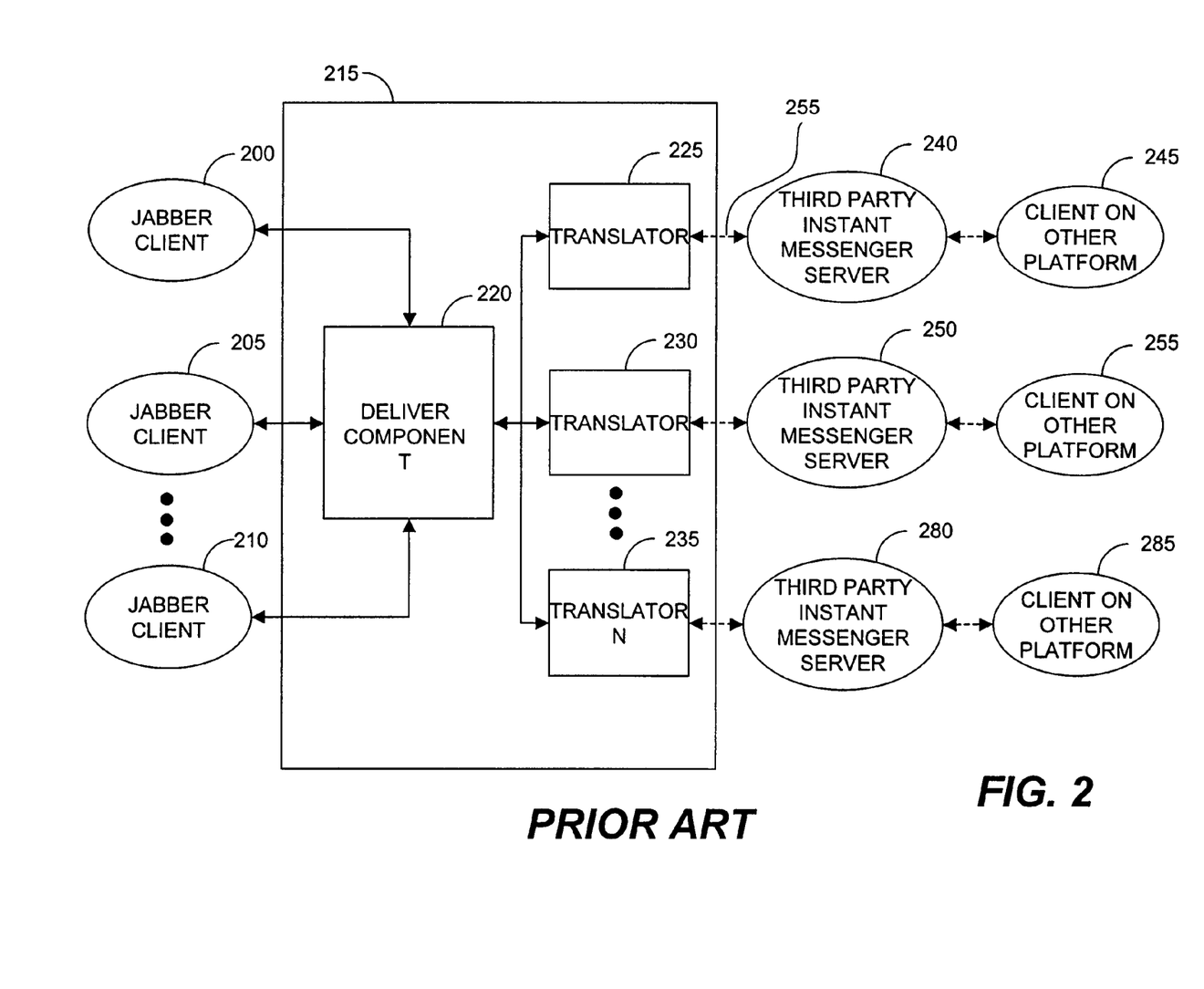
FIG. 2 is an illustration of a prior art JABBER interoperable XML-based instant messaging network.

A block diagram illustrating a prior art IM network that uses JABBER Interoperable XML-Based Network architecture is shown in FIG. 2. JABBER is a real-time communications platform based on open protocols and Extensive Markup Language (XML), and whose architecture is based on the well-known electronic mail system. Because JABBER is based on the email system, the JABBER architecture contains distributed network servers, called JABBER servers 215, and clients, known as JABBER clients 200, 205, 210, that receive and send messages to JABBER clients connected to any JABBER server on the Internet. However, unlike typical email systems, which are store and forward systems, JABBER delivers messages in real time because the JABBER server 215 knows when a particular JABBER client is online.

Two features of JABBER make it unique over common prior art IM systems. First, JABBER uses an open protocol that allows interoperability among various IM systems. Second, JABBER is based on XML, which allows for easy and reliable structured messaging between software applications.

The JABBER architecture is based on client-server architecture and not on a client-to-client architecture, as are most IM systems. Messages from JABBER client 200 to JABBER client 210 must pass through the JABBER server 215. Each JABBER client is attached to a local JABBER server 215. Each local JABBER server 215 receives information from one JABBER client 200 and transfers the information to another JABBER client along with presence information. Each local JABBER server 215 functions independently from one another, and can communicate with any other JABBER server that is connected to the Internet as long as it has been identified, and predisposed to do so ahead of time.

Each local JABBER server 215 performs two functions: listening for and communicating directly with JABBER client applications, and communicating-with other JABBER servers. Each local JABBER server 215 consists of multiple components that separately handle individual functions with the JABBER system. At the core of the local JABBER server 215 is a deliver component 220, which performs the following tasks: session management, client-to-server communications, server-to-server communications, group chat, storing messages for JABBER clients currently offline, DNS resolution, user authentification, user registration, database lookups filtering messages for offline users, and the like.

Additionally, each JABBER server 215 contains "transports" 225, 230, and 235 that communicate with other servers operating under protocols that are foreign to JABBER's open XML format. The transports act as translators between the deliver component 220 of the local JABBER server 215 and a third party instant messenger server. Each transport contains their own session manager that translates JABBER XML into and out the "foreign" protocol for presence, messaging, and information/query requests. In general, when a client logs onto the JABBER server 215, a thread is created in the transport to handle all communication from that client. Typically, the translation to and from JABBER XML is straightforward when the foreign protocol is well documented, as in the case of IRC protocols, and the AIM protocol. However, for other foreign protocols that are poorly documented, such as Yahoo!® Instant Messenger, the translation to and from JABBER XML can either be difficult and slow. Currently, transports are available to translate to and from the following protocols: AOL® AIM, ICQ, IRC, MSN Messenger, Rich Site Summary (RSS ver. 0.9), and Yahoo!® Instant Messenger.

As an example, when the JABBER client 200 wishes to communicate with a client 245 on a third party instant messenger server 240, such as AOL Instant Messenger, the JABBER client 200 first generates a message which is sent to the local JABBER server 215. The message contains JABBER ID that contains the name of the third party instant messaging server 240 (e.g., johndoe@aim.goabber.org). The local JABBER server 215 routes the message to the appropriate translator, which in the illustration is Translator 225. If the Translator 225 is running locally on the local JABBER server 215, the JABBER server 215 communicates directly with the Translator 225. If, however, the Transport 225 is running remotely, the JABBER server 215 passes the XML packet to the remote server, which then forwards it onto the Translator 225. After the local JABBER server 215 has passed the message to the Translator 225, the Translator 225 translates the XML packet into a native packet, which is readable by the third party instant messenger server 240. The third party instant messenger server 240 in turn, passes the translated packet onto the appropriate client 245.

The Jabber architecture relies heavily on translators and is constrained by its ability to keep up with each provider's protocol, and method of handling presence. Thus, there is a need in the art for a simple, cost effective IM network architecture that uses a universal IM presence and interconnection methodology that is compatible with the existing IM Service Provider networks.

SUMMARY OF THE INVENTION

The present invention addresses the above-described needs in a universal instant messaging system. Generally described, a computer network system according to an embodiment of the invention for establishing a communications link between a first user registered with a first service provider network and at least one user registered with a second service provider network when the two networks operate using different protocols. The networks, which are connected by a distributed network, such as the Internet, each contain a Local IM server connected to each user. The Local IM server controls the flow of electronic information between the users logged onto the particular network.

The networks also contain a Universal IM server that is connected between the Local IM server and the distributed network. The Universal IM server contains a database that stores routing information and Presence information for each user registered with the first service provider network and some of the users of other provider networks. The Presence information contains user attributes and a set of logic rules that are used to control the communications link between the first and second users. The user attributes contained in the Presence information include a list of each Internet device each user has registered to receive electronic messages, a list of connection options for each registered Internet device, a list of available states for each Internet device, and an application identifier associated with each Internet device.

Additionally, the Presence information contains a set of logic rules that govern the communications link between the first and second user. The logic rules include a hierarchical listing of each user's registered Internet devices that indicates the order in which each Internet device should be contacted to establish the communications link, a security level for each registered Internet device, and a listing of the applications that each Internet device is able to support.

A method according to an embodiment of the invention, establishes an instant message session between a first user registered on a first ISP (ISP) network and a second user registered on a second ISP over the Internet when the first and second ISPs are operating under different instant messaging protocols. The method begins by the first user generating a connection request and transmitting it to a Local IM server associated with the first ISP. The connection request contains a USERID associated with the second user. The Local IM server checks the routing information for the connection request to determine whether the second user is registered with the first ISP. If the second user is registered with the first ISP, the Local IM server associated with the first ISP establishes the instant message session between the two users. If however, the second user is registered with another Local IM server, the connection request is routed to a Universal IM server to determine the appropriate Local IM server to receive the request. The Universal IM server contains a database that lists each user on its own network and selected users on other ISPs. The selected users are derived from the contact lists or rosters for each user on the first ISP network. A determination is made at the Universal IM server on the first ISP whether the second user is listed in the database. If the second user is listed in the database, the Universal IM server connected to the first ISP forwards the connection request to a Universal IM server connected to the second ISP. The Universal IM server connected to the second ISP then transmits back to the Universal IM server on the first ISP the routing information and the Presence information associated with the second user. The first Universal IM server then establishes an instant message session based on the routing and Presence information returned from the Universal IM server using the extensive markup language (XML) protocol.

BRIEF DESCRIPTION OF DRAWINGS

The accompanying drawings, which are incorporated in and form a part of the specification, illustrate preferred embodiments of the present invention and, together with the description, disclose the principles of the invention. In the drawings.

DETAILED DESCRIPTION OF THE EMBODIMENTS

The present invention is directed toward novel architectures, systems, and methods for providing instant messages (IM) over a distributed network to multiple users connected to different Internet devices, such as personal computer, cellular telephones, Personal Digital Assistants, pagers, and the like on separate ISPs (ISP) operating different IM protocol standards.

Exemplary Internet Device

Figure 3:
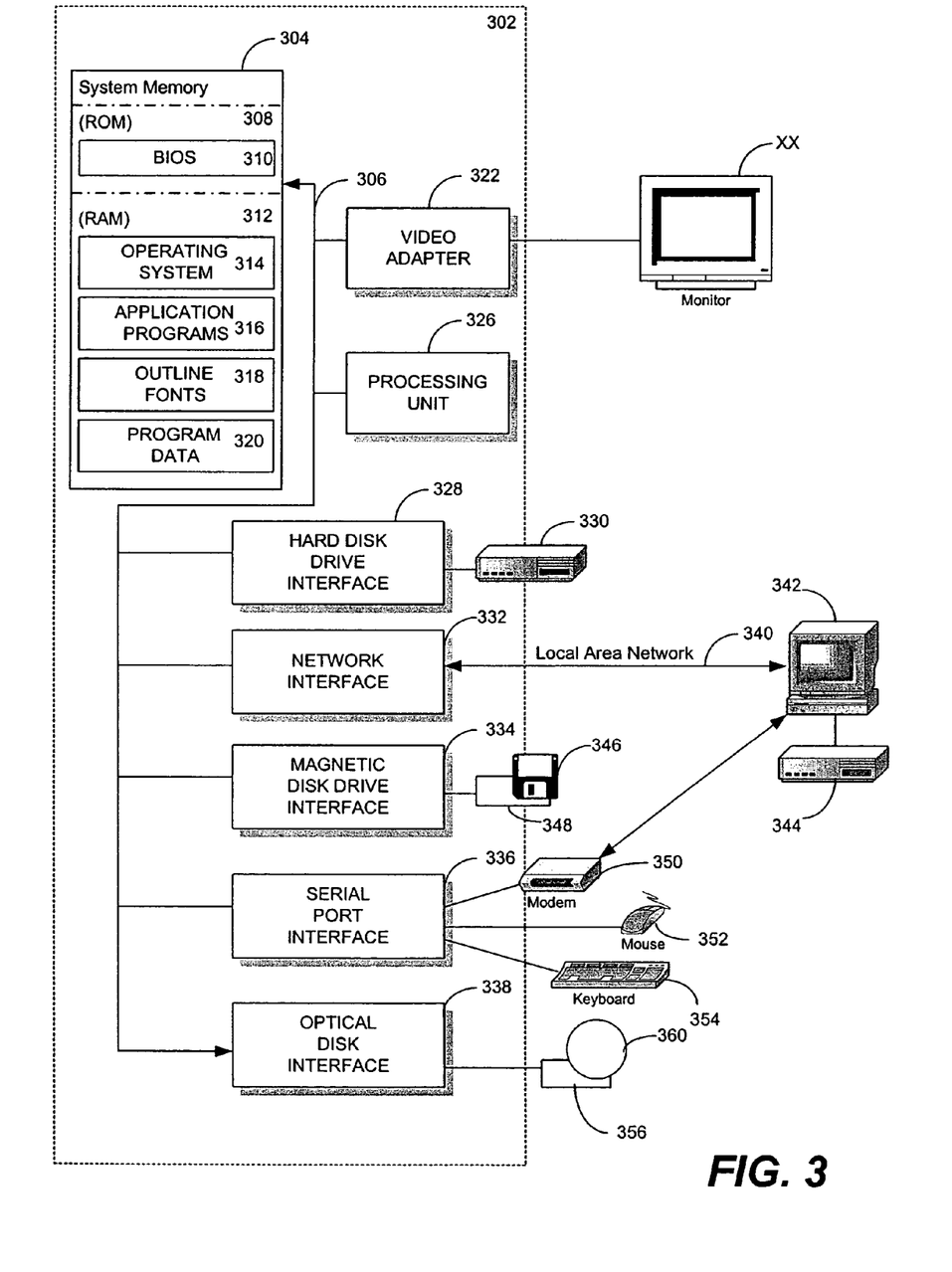
FIG. 3 is block diagram of a personal computer that provides the operating environment for an embodiment of the invention.

An exemplary Internet device for implementing the invention is shown in FIG. 3, which includes a conventional personal computer 100 with a processing unit 326, a system memory 304, and a system bus 306, which joins the system memory 304 to the processing unit 326. The system memory 304 includes read only memory (ROM) 308 and random access memory (RAM) 312. The basic input/output system (BIOS) 310 is stored in ROM 308, and contains basic routines that aid in transferring information between elements within the personal computer 300, as found during start-up. Further, the personal computer 300 contains a hard disk drive 330, a magnetic disk drive 348, and an optical disk drive 356, e.g., to read from or write to other optical media, or for reading a CD-ROM disk 360. A hard disk drive interface 328, a magnetic disk drive interface 334, and an optical drive interface 338, connect the hard disk drive 330, magnetic disk drive 348, and optical disk drive 356 to the system bus 306. Non-volatile storage is provided for the personal computer 302 by the drives and their associated computer-readable media. Those skilled in the art should recognize that other types of media are readable by a computer, e.g., magnetic cassettes, digital video disks, flash memory cards, ZIP cartridges, JAZZ cartridges, etc. may be used in the exemplary operating environment as well as the computer-readable media described above.

Various program modules may be stored in the RAM 312. These include, but are not limited to, an operating system 314, one or more application programs 316, and program data 320, and other program modules. The personal computer 302 allows commands and information to be entered by devices such as a keyboard 354, a mouse 352, or other input device. Along with these conventional devices, pens, touch-operated devices, microphones, joysticks, game pads, satellite dishes, scanners, etc. may also be used to enter commands or information. The input devices are typically connected to the processing unit 326 through a serial port interface 336 coupled to the system bus 306. The devices may also be connected by other interfaces, such as a game port or a universal serial bus (USB). A display screen 324 or other type of display device is connected to the system bus 306 via a video adapter interface 322. It is typical of personal computers to include other peripheral output devices, such as speakers or printers, as well as the display screen 324.

Logical connections to one or more remote computers 342, allow the personal computer 302 to operate in a networked environment. Although the remote computer 342 has been shown as a personal computer, in FIG. 3, it should be apparent to those skilled in the art that the remote computer 342 may be a server, a router, a peer device or other common network node, and on average includes many or all of the elements described in relation to the personal computer 302. A local area network (LAN) 340 and a wide area network (WAN) 362 are the typical logical connections that connect the personal computer 102 to the remote computer 342. These logical connections are commonly found in offices and enterprise-wide computer networks, such as intranets and the Internet.

The personal computer is connected to the LAN 340 through a network interface 332, when used in a LAN networking environment. In a WAN networking environment, the personal computer 302 normally includes a modem 350 or other channels of establishing communications over the WAN 362, (e.g. the Internet). The modem 350 is connected to the system bus 160 via the serial port interface 336, which may be either internal or external to the personal computer 302. The application programs 316 described above relative to the personal computer 302, or any part thereof, may be stored in the remote memory storage device 344 of the networked computer 342 in the networked environment. The network connections shown are exemplary and those skilled in the art will appreciate that other ways of establishing a communications link between the personal computer and the remote computer exist without departing from the scope of this invention.

Universal Instant Messaging Architecture

Figure 4:
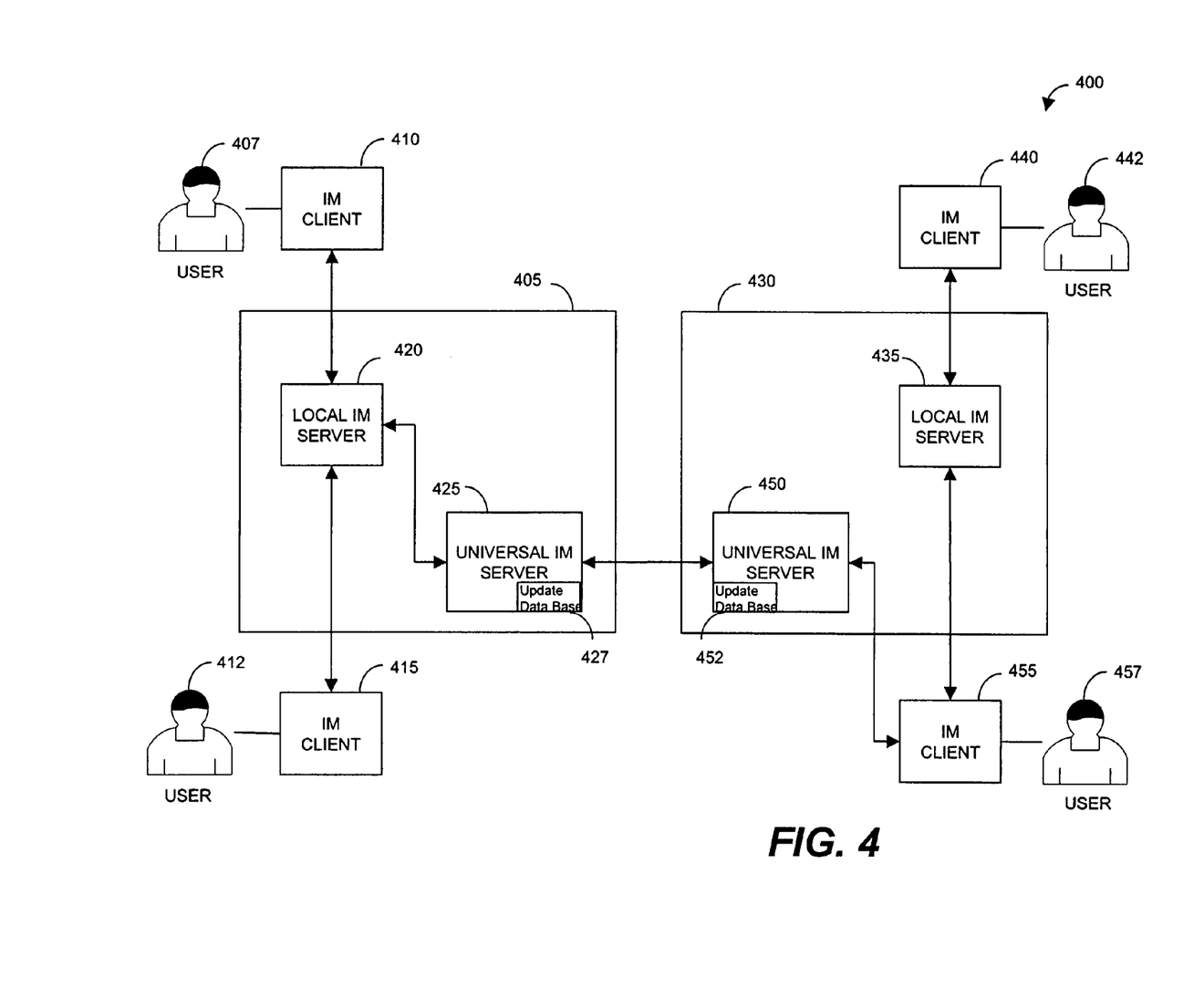
FIG. 4 is an illustration of a universal instant messaging architecture using an exemplary embodiment of the invention.

FIG. 4 is an illustration of a Universal IM architecture 400. The Universal IM architecture 400 uses a universal protocol, such as the extensible markup language (XML) protocol to allow users of different ISPs (ISPs) 405 and 430 that use proprietary protocols to communicate with one another. A Universal IM server 425 located at ISP 405 is the key feature of the Universal IM architecture 400. FIG. 4 illustrates two separate ISP Networks, ISP 405 and ISP 430. Because the two networks are identical, the discussion of the Universal IM architecture 400 for purposes of this application is limited to the ISP 405. Additionally, the discussion of the ISP 405 will be limited to the components that provide the Universal IM service.

The ISP 405 contains two servers: a Local IM server 420 and the Universal IM server 425. The Local IM server 420 provides the standard IM function for the ISP 405. The Universal IM server 425 provides the Universal IM function that allows the user 412, who is registered with the ISP 405, to communicate with another user 457, registered with the second ISP 430. The Local IM server 420 provides connections to an IM client 430 and an IM client 415, which allows a user 407 and the user 412, respectively, to access the proprietary IM and Universal functions of the ISP 405. The Local IM server 420 is "bimodal," in that it uses both a proprietary and universal format to provide a proprietary IM function that only allows the users 407 and 412, who are registered with the ISP 405 to send and receive instant messages. For example, if only one user 412 has registered with the Universal IM server 425, then the Local IM server 420 will transfer instant messages between the users 407 and 412 using the proprietary protocol. However, if both user 407 and 412 are registered with the Universal IM server 425, then the Local IM server 425 will transfer instant messages between them using the universal protocol. By supporting both formats at the Local IM server 420, users can migrate to the universal format over time. When all users have migrated the proprietary format can be discontinued.

The Universal IM server 425 removes the restrictions associated with proprietary IM functions associated with the ISP 405. The Universal IM server 425 uses a universal format, such a extensible markup language (XML), or any other suitable universal format, that allows users registered with an ISP 405, such as BellSouth DotNet, to send and receive instant messages to another user 457 registered with another ISP 430, such as AOL®.

The user 412 accesses the Local IM server 420 of the ISP 405 through the IM client 415. The IM client 415 typically contains a proprietary software program that is capable of opening communications sockets that allow the IM client 415 to communicate with the Local IM server 420 using either the proprietary or Universal IM protocols. The software program is capable of formatting an instant message sent from the IM client 415 to the appropriate format used by the IM function of the ISP 405. In this manner, the user 412 is capable of communicating with any another user 407 registered with the ISP 405. However, the Local IM server 420 is also connected to the Universal IM server 425. The Universal IM server 425 is in turn, connected to another Universal IM server 450 on the second ISP 430 via a distributed network, such as the Internet. This allows the user 412 to communicate not only with the user 407 who is registered with the ISP 405, but also with user 457 who is registered with the second ISP 430 that uses a different proprietary IM protocol to send and receive instant messages within the network of the ISP 430.

In order for the user 412 to be able to send and receive instant messages with the user 457 on the second ISP 430, the IM client 415 must be able to identify the IP address and Presence information associated with the user 457. The Presence information for the user 457 is stored on the Universal IM server 425 connected to the first ISP 405. The Universal IM server 425 on the first ISP 405 stores the IP address and Presence information for the user 457. Therefore, the user 412, who is registered with the Universal IM server 425 on the first ISP 405 has access to the IP address and Presence information of the user 457. The user 412 will not be able to communicate with another user 442 if the user 442 is not registered with the Universal IM server 450 but instead is only registered with a Local IM server 435 and as a result, is able to send and receive instant messages using only the proprietary format. Therefore, the user 442 is limited to communicating via instant messages with users of the second ISP 430, such as user 457.

An advantageous feature of the Universal IM architecture 400 is that it is designed to be easily integrated within existing ISPs, such as AOL® and MSN® without disrupting the current IM function of these ISPs. Each ISP that adopts the Universal IM architecture 400 requires only a slight modification to the existing network. The ISP needs to add an additional server to function as the Universal IM server and install a universal IM application program on the Local IM server and each IM client attached to the network. The Universal IM application program that is installed at each IM client converts the IM client 415 to function as "bimodal." That is, the IM client 415 is capable of using the proprietary IM protocol of the ISP 405 and the Universal protocol of the Universal IM architecture 400. The bimodal nature of the IM client 415 allow the Universal IM server 425 to be implemented into existing ISPs such as AOL® and MSN without disrupting the current proprietary IM functions of those services. This allows the current users 407, 412 to continue using the proprietary IM function of their particular ISP 405 and 430, until every user can be converted to Universal IM protocol.

Registration of a User Under the Universal IM Architecture

User registration with the Universal IM server 425 is performed in the same way the user currently registers with the Local IM server 420 except that the registration process occurs with the Universal IM server 425. The user 412 first transmits a new user identification (USERID) request along with personal identifying attributes, such as his or her name, address, billing information, screen name, and the like from the IM client 415 to the Universal IM server 425 via the Local IM server 420. The Universal IM server 425 validates the USERID as being unique and stores the USERID in an Update Database 427. The same procedure occurs for registering the user 412 with the Local IM server 420.

The IM client 415 contains two communication ports: one communication port connected to the Local IM server 420 and one communication port connected to the Universal IM server 425. This allows the IM client 415 to be "bimodal." That is, the IM client 415 may function in one or two modes: the proprietary IM mode and/or the universal IM mode. The IM client 415 functions in the proprietary IM mode when the user 412 communicates with another user 407, who is also registered with the ISP 405, but has not converted to a universal format by registering with the Universal Server 425. The users 412 and 407 communicate using the proprietary IM protocol of the ISP 405, which is well known. However, when the user 412 communicates with another user 457 who is registered with the different ISP 430 and is also connected to the Universal IM server 425, the IM client 415 functions in the universal IM mode. The bimodal nature of the IM client 415 allows users of current ISPs, such as AOL® and MSN® to implement the Universal IM architecture 400 without disrupting the current IM functionality.

After the user 412 provides the required personal information to the Universal IM server 425, the Universal IM server 425 issues a USERID to the user 412 and registers the current IP address for the IM client 415 to use with the universal IM function. The registration of the IP address is done in anticipation of the user 412 going into the active mode with the ISP 405. However, there are cases where the IP address is fixed because of the nature of the usage. A fixed address enables future applications by allowing any application to use the Instant Messaging architecture 400 to check the status of a computer or other application to see if it is active.

When the user 412 first logs onto the ISP 405 and activates the IM feature, the IM client 415 polls both the Local & Universal IM servers 420 and 425 associated ISP 405 for Presence information to create a roster of users logged onto the network. To create the roster, the IM client 415 retrieves the client lists and Presence information for all users listed in its roster for both the proprietary Local IM server 420 and the Universal IM server 425. Once the client lists are retrieved, the Universal IM application program installed at the IM client 415 examines the address of each user to determine which users may be reached through the Local IM server 420 or the Universal IM server 425. Each ISP's Universal IM server will only keep information on users from other networks as they are added to each local users roster. This reduces updates between Universal IM servers and the size of the database that must be maintained.

If the user 412 is logged onto the Universal IM server 425, the USERID of the IM client 415 will include additional characters that identify them as being registered under the Universal IM server 425. As an example, a typical USERID and domain name, which is well known in the art, may be johndoe@internetprovider.com. However, for a user registered on the Universal IM server 425, the domain name may contain an additional character, such as the characters "-u." Those skilled in the art will appreciate that any character or characters may be added to the domain name without departing from the scope of the invention. The additional character(s) may be placed at the beginning of the domain name such as johndoe@u-internetprovider.com) or at the end of the domain name (johndoe@internetprovider-u.com). Although the special characters is shown as a single character, those skilled in the art will appreciate that the special characters may contain any number of characters to distinguish that the domain is associated with the Universal IM server 425 without departing from the scope of the invention.

Once the roster is loaded onto the IM client 415, the roster may be displayed on the display device of the IM client 415. The users who are registered with the Universal IM server 425 are typically highlighted to allow the user 412 to easily distinguish which users are registered under the Universal IM server 425 and which user are registered under the local IM server 420 so that the user 412 can easily add users to his or her contact list and select users to send instant messages.

Figure 5:
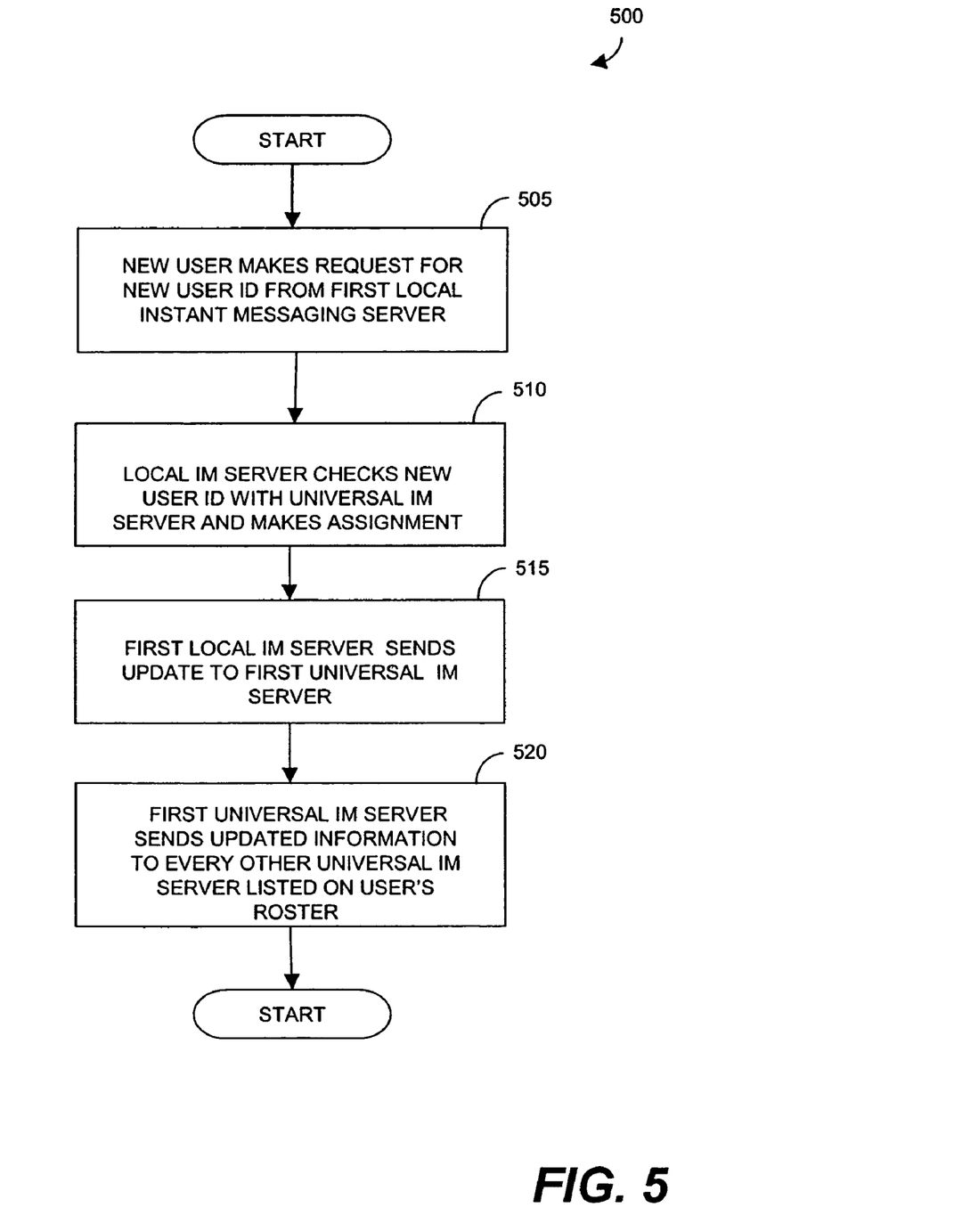
FIG. 5 is a logic flow diagram illustrating a method for registering a new user with a Service Provider Network using the universal instant messaging architecture.

FIG. 5 is a logic flow diagram illustrating a routine 500 for registering a user 412 with the Universal IM server 425. Routine 500 begins at 505, in which the user 412 generates a request to the Local IM server 420 to register with the ISP 405 and acquire a new user identification (USERID) code.

At 510, the Local IM server 420 creates a new USERID and transmits it back to the user 412 through the IM client 415. The Local IM server 420 creates a new data file associated with the user 412 and stores the data file the database located on the Local IM server 420. The database typically contains personal information associated with the new user 412, which includes, but is not limited to, the name, the address, billing information, and USERID associated with the user 412. Additionally, the database contains the Presence information associated with the new user 412, the IP address associated with each Internet device, and a set of rules for transmitting instant messages. The Presence information typically contains a list of user attributes, which include the list of Internet devices, the links used to connect the devices to the Internet, and a list of particular applications that each device can support. The attributes also contain a list of the states that each device may occupy, such as a busy state, a ready state, and the like.

The logic rules control how, and to which Internet device(s) an instant message is sent. For example, if the user 412 has registered as Internet devices a personal computer, a PDA, and a cellular telephone, the set of rules may contain instructions listing the order of Internet devices that the Local IM server 420 should attempt to deliver an instant message. For instance, the user 412 may have set up the rules to instruct the Local IM server 420 to initially attempt to deliver the instant message to the new user's personal computer. If the user 420 does not receive the instant message at his or her personal computer, then the logic rules instruct the Local IM server 420 to attempt to deliver the instant message to the new user's PDA. Finally, if the message cannot be delivered to the user's PDA, then the message is delivered to the cellular telephone.

At 515, the Local IM server 420 sends the new USERID to the Universal IM server 425 for validation of the unique address. The Universal IM server 425 is different from the Local IM server 420, in that the Universal IM server 425 contains the names and addresses of every user on the ISP 405 that has registered with a bi-modal client on its network, and all entries for other ISP users that have been requested via the client rosters. The Local IM server 420, on the other hand, only contains the names and IP addresses of the users registered with the ISP 405 that use the ISP's proprietary IM protocol and local universal service users that have been assigned to that server.

At 520, the Universal IM server 425 located on the first ISP 405 broadcasts the new user information to all the Universal IM servers that have requested presence tracking for that user. As each new user is added to Universal IM server 425 their roster information is checked to see which ISPs will need updates to their Presence information. Providing this update to the Universal IM server 450 associated with the second ISP 430 allows the user 457 to send and receive instant messages with the new user 412. The Universal IM server 425 broadcasts updated user information each time a new user registers with the ISP 405. Similarly, each time a new user registers with the second ISP 430, the same procedure occurs of broadcasting the user information to the Universal IM server 425 connected to the ISP 405. Although only two Universal IM servers 425 and 450 are shown in the FIG. 4, those skilled in the art will appreciate that any number of Universal IM servers, each associated with a different ISP, can be connected to the network without altering the scope of the invention.

Availability Indicator

One advantage of using the Universal IM server 425 is that the availability of each user 412 and 457 may be tracked by using the Presence information. Typically, the Presence information of the user 412 will be stored in the database 452 in Universal IM server 450 of the ISP 430. The Presence information indicates when and where the particular user 412 is logged onto the ISP 405. Normally, the Presence information of the user 412 is checked when the user 412 requests an IM session with a second user 457. If the Presence information indicates that the second user 457 is logged onto the network, the connection is made and the IM session is initiated. If, however, the Presence information indicates that a particular recipient is not logged onto the ISP 430, then no IM session is established.

An alternative method of monitoring a user's availability using Presence information is tracking the user's past history. If a particular user 412 has several Internet appliances capable of receiving IM messaging, Presence information can be used to monitor the availability of that particular user at each of his or her registered Internet devices. For example, the user 412 may have a computer at their home, a computer at their office, and an Internet capable cell phone. The user's past history may show that the user is typically logged onto the network through their office computer between the 9:00 AM and 5:00 PM, their cell phone between 3:00 PM and 6:00 PM and their home computer between 10:00 PM and 11:00 PM. Each Internet device may be registered with the same Service Provider Network or different Service Provider Networks. When the user 412 requests to establish an IM session with the user 457 on the second ISP 430 the Universal IM server 425 returns both the times that the user 457 is available and on what Internet devices the user 457 may be reached. The user 412 may then set an alert to notify when the user 457 is available to establish an IM session. The notification will only occur when the user 457 is logged onto the network. For instance, if the user 412 would like to establish an IM session with the user 457 between 4:00 PM and 6:00 PM, the requesting user 412 can set an alert to monitor the Presence information of the user 457 on the Universal IM server 450. The Presence information is updated at the Universal IM server 425 on the ISP 405 each time the user 457 logs onto or off of the ISP 430. If the user 412 logs onto the ISP 430 between 4:00 PM and 6:00 PM, the user 457 will be notified, and allowed to establish an IM session.

Establish an IM Session using the Universal Architecture

To establish an IM session, the user 412 selects the name of the recipient from his or her personal contact list for use with the IM function. The name of the recipient is then retrieved from the roster, which was loaded when the user 412 first signed onto the ISP 405. Next, the Universal IM application program installed on the IM client 415 sends a connection request to the Local IM server 420, which determines whether the user is registered with the first ISP 405. Specifically, the network extension of the USERID of the recipient is compared to the network extension that is used to identify the first ISP 405. If the extension of the recipient is registered with the first ISP 405 then the Local IM server 420 determines whether that user is connected to their portion of the ISP network. If it is, then it proceeds directly to make the connection. If the user is connected to a different Local IM server, the request is routed to the appropriate Local IM server for handling.

If the second user is not registered with the first ISP 405, then the connection request is forwarded to the Universal IM server 425. The Universal IM server 425 inspects the routing information to determine whether the second user 457 on ISP 430 is listed in the Universal IM server 425 database. If the second user 457 is contained in the database then the Universal IM server 425 sends the request to the Universal IM server 450 associated with the second ISP 430. The Universal IM server 450 checks the Presence information associated with the second user 457 and then establishes an IM session using the Presence information for IM client 455, as appropriate.

Figure 6:
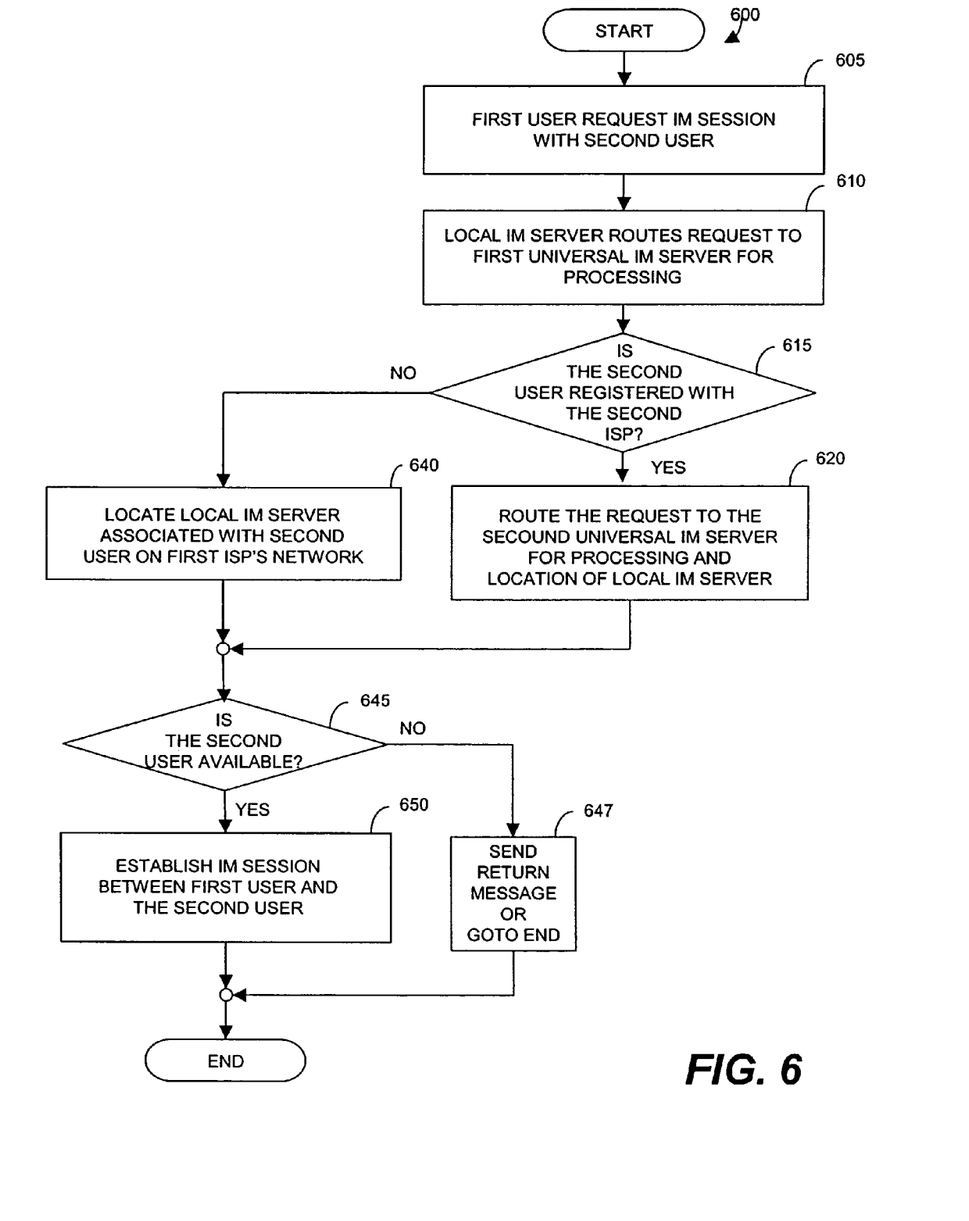
FIG. 6 is logic flow diagram illustrating a method of establishing a communications link between at least two users using the universal instant messaging architecture.

FIG. 6 is a logic flow diagram illustrating a routine 600 for using the Universal IM architecture 400 for establishing an instant messaging session. Those skilled in the art will appreciate that the logic flow diagram of FIG. 6 is executed by the processing unit 126 (FIG. 1) in response to instructions that have been incorporated into the Universal Instant Messaging application program.

The routine 600 begins at 605, in which the first user 412 on the first ISP 405 requests an IM session with the second user 457 on the second ISP 430. In the request, the first user 412 typically identifies the second user 457 with whom they want to establish an IM session from a list of instant messaging contacts that the first user 412 has previously defined. To establish the connection, the first user 412 simply opens the contact list, and selects the person with which he or she wants to conduct an IM session. Alternatively, the first user 412 can type the name and or IP address of the second user 457 to begin the IM session.

At 610, the Local IM server 420 makes a connection request to the Universal IM server 425. At 615 the Universal IM server 425 examines the extension of the USERID to determine whether the second user 457 is registered with the second ISP 430. If the second user is registered with the second ISP 430, then the "YES" branch is followed to 620, in which the connection request is routed to the Universal IM server 450 for further processing. The Universal IM server 450 will then locate the appropriate Local IM server 435, which will make the connection to the user's desired device.

At 645 the Local IM server checks to see if the second user is available on any registered device. The determination is made by checking the Presence information associated with the second user. If the second user is available, the Presence information will indicate that the second user is currently logged onto the second ISP 430 and the "YES" branch is followed to 650, in which the Local IM server 425 establishes and IM session between the first user and the second user. If however, the second user is not available, the "NO" branch is followed to 647 in which a return response is sent to the originator or the communication connection is terminated.

If the domain name is the same as the ISP 405, then the no branch is followed to step 640 where the Local IM SERVER 420 is located and used to route the connection request to the second user. The Universal IM server 425 contains a table mapping all ISP users to Local IM servers as part of their presence and roster registration, and is used to find the IP addresses of correct server and forward the connection request.

At 645 the Local IM server checks to see if the second user is available on any device. If the second user is available, the "YES" branch is followed to 650, in which the Local IM server 425 establishes an IM session between the first user and the second user, who are both logged onto the first ISP 405. If however, the second user is not available, the "NO" branch is followed to 647 in which a return response is sent to the first user or the communication connection is terminated.

Although the present invention has been described in terms of instant messaging, those skilled in the art will appreciate that the invention may be applied to any form of electronic communications, such as text messaging, audio messaging and video messaging and application-to-application communication.

It should be understood that the foregoing pertains only to the preferred embodiments of the present invention, and that numerous changes may be made to the embodiments described herein without departing from the spirit and scope of the invention.

We claim:

1. A system for allowing a first user associated with a first internet service provider (ISP) to establish an instant messaging (IM) session with a second user associated with a second ISP, comprising:
    a memory component configured to store a program that performs at least the following:
    storing routing information and presence information associated with the second user who is associated with the second ISP; and
    utilizing the routing information and presence information to facilitate communication between the first user and the second user using a universal IM protocol,
    wherein the system is coupled to a bimodal local IM server that establishes an IM connection between at least two users registered with the first ISP using a proprietary IM protocol, wherein upon determination that the at least two users are configured to communicate using the universal IM protocol, the bimodal local IM server facilitates communication between the at least two users using the universal IM protocol.

2. The system of claim 1, wherein the system is embodied as a first universal IM server and is coupled to a plurality of bimodal IM clients that establish a connection with the local IM server using the proprietary IM protocol.

3. The system of claim 2, the program further establishing a connection with a second universal IM server using the universal IM protocol.

4. The system of claim 1, wherein the bimodal local IM server includes the routing information and presence information for at least one user registered with the bimodal local IM server.

5. The system of claim 1, wherein the bimodal local IM sever establishes an IM session between at least two users registered with a common ISP using the proprietary IM protocol.

6. The system of claim 1, wherein the bimodal local IM server establishes a connection between at least two users registered with a common ISP using the universal IM protocol.

7. The system of claim 1, wherein at least one user is registered with the system.

8. The system of claim 1, wherein the presence information comprises:
    a list of personal information associated with the at least one user;
    a list of the Internet device types associated with at least one user; and
    a list of connection options associated with at least one user.

9. The system of claim 1, wherein the universal IM protocol is structured in extensible markup language (XML).

10. A method for allowing a first user associated with a first internet service provider (ISP) to establish an instant messaging (IM) session with a second user associated with a second ISP, comprising:

storing routing information and presence information associated with the second user who is associated with the second ISP;

utilizing the routing information and presence information to facilitate communication between the first user and the second user using a universal IM protocol; and coupling to a bimodal local IM server that establishes an IM connection between at least two users registered with the first ISP using a proprietary IM protocol, wherein upon a determination that the at least two users are configured to communicate using the universal IM protocol, the bimodal local IM server facilitates communication between the at least two users using the universal IM protocol.

11. The method of claim 10, further comprising communicatively coupling to a plurality of bimodal IM clients that establish a connection with the bimodal local IM server using the proprietary IM protocol.

12. The method of claim 10, further comprising establishing a connection with a universal IM server using the universal IM protocol.

13. The method of claim 10, wherein the bimodal local IM server includes the routing information and presence information for at least one user registered with the bimodal local IM server.

14. The method of claim 10, wherein the local IM sever establishes an IM session between at least two users registered with a common ISP using the proprietary IM protocol.

15. The method of claim 10, wherein the bimodal local IM server establishes a connection between at least two users registered with a common ISP using the universal IM protocol.

16. The method of claim 10, wherein at least one user is registered with the universal IM server.

17. The method of claim 10, wherein the presence information comprises:

a list of personal information associated with the at least one user;

a list of the Internet device types associated with at least one user; and a list of connection options associated with at least one user.

18. The method of claim 10, wherein the universal IM protocol is structured in extensible markup language (XML).

19. A computer-readable medium that includes a program that, when executed by a computer, allows a first user associated with a first internet service provider (ISP) to establish an instant messaging (IM) session with a second user associated with a second ISP, the program configured to perform at least the following:

storing routing information and presence information associated with the second user who is associated with the second ISP;

utilizing the routing information and presence information to facilitate communication between the first user and the second user using a universal IM protocol; and coupling to a bimodal local IM server that establishes an IM connection between at least two users registered with the first ISP using a proprietary IM protocol, wherein upon a determination that the at least two users are configured to communicate using the universal IM protocol, the bimodal local IM server facilitates communication between the at least two users using the universal IM protocol.

20. The computer-readable medium of claim 19, the program further coupling to a plurality of bimodal IM clients that establish a connection with the local IM server using the proprietary IM protocol.

21. The computer-readable medium of claim 19, the program further establishing a connection with a universal IM server using the universal IM protocol.

22. The computer-readable medium of claim 19, wherein the bimodal local IM server includes the routing information and presence information for at least one user registered with the bimodal local IM server.

23. The computer-readable medium of claim 19, wherein the bimodal local IM sever establishes an IM session between at least two users registered with a common ISP using the proprietary IM protocol.

24. The computer-readable medium of claim 19, wherein the bimodal local IM server establishes a connection between at least two users registered with a common ISP using the universal IM protocol.

* * * * *